(12) United States Patent
Holt (10) Patent No.: US 6,231,944 B1
(45) Date of Patent: May 15, 2001

(54) METHOD FOR PRODUCING A THERMAL, ACOUSTICAL AND/OR VIBRATIONAL ABATEMENT SHIELD AND SHIELD PRODUCED THEREBY

(75) Inventor: Brent D. Holt, Danville, VT (US)

(73) Assignee: Lydall, Inc., Manchester, CT (US)

( * ) Notice: Subject to any disclaimer, the term of this patent is extended or adjusted under 35 U.S.C. 154(b) by 0 days.

(21) Appl. No.: 09/361,228

(22) Filed: Jul. 27, 1999

(51) Int. Cl.$^7$ ...................................................... B32B 1/06
(52) U.S. Cl. .................................. 428/57; 428/75; 29/521
(58) Field of Search ................................ 428/75, 68, 57; 403/285, 282; 29/521, 509

(56) References Cited

U.S. PATENT DOCUMENTS

| | | |
|---|---|---|
| 1,206,487 | * 11/1916 | Voltz et al. . |
| 4,632,592 | * 12/1986 | Gunter ................................. 403/285 |
| 4,760,634 | 8/1988 | Rapp . |
| 4,831,711 | 5/1989 | Rapp . |
| 4,897,912 | 2/1990 | Slasinski . |
| 4,910,853 | 3/1990 | Sawdon . |
| 5,155,897 | 10/1992 | Schleicher . |
| 5,230,136 | 7/1993 | Cronn et al. . |
| 5,517,743 | * 5/1996 | Liebig et al. ........................... 29/521 |

* cited by examiner

Primary Examiner—Alexander S. Thomas
(74) Attorney, Agent, or Firm—Birch, Stewart, Kolasch & Birch, LLP (57) ABSTRACT

A method for making and a thermal, acoustical and/or vibrational shield (1) which has an upper metal foil (2), a lower metal foil (3), and a thermal, acoustical and/or vibrational abatement insulation (4) disposed between the upper foil (2) and the lower foil (3). An upper periphery (5) of the upper foil (2) and a lower periphery (6) of the lower foil (3) are in vertical juxtaposition and totally enclose the insulation. At least one punched section (7) seals the upper periphery (5) to the lower periphery (6). The punched section (7) has a portion of the upper periphery (5) in an upper S-shaped configuration at each side of punched section (7) with upper laterally-extending walls (31), a portion of the lower periphery (6) in a lower S-shaped configuration at each side of punched section (7) with lower laterally-extending walls (33), and a horizontal upper wall (33) and a horizontal lower wall (34) extending, respectively, from the upper S-shaped configurations and the lower S-shaped configurations. The upper S-shaped configurations totally enclose the lower S-shaped configurations, and the upper laterally-extending walls (31) compressively contact the lower laterally-extending walls (33).

25 Claims, 4 Drawing Sheets

METHOD FOR PRODUCING A THERMAL, ACOUSTICAL AND/OR VIBRATIONAL ABATEMENT SHIELD AND SHIELD PRODUCED THEREBY

The present invention relates to a method for producing a shield which has thermal, acoustical and/or vibrational abatement properties and to that shield. More particularly, the invention relates to method and shield where metal foils forming the outside surfaces of the shield are mechanically sealed at peripheries of the shield, so that the shield is acceptable for severe duty application, such as shielding components of an automobile or truck, e.g. engine components, exhaust components, and the like.

BACKGROUND OF THE INVENTION

Thermal, acoustical and/or vibrational abatement shields have been used in severe duty applications, such as in the engine compartment and exhaust tunnels of automobiles and trucks, to reduce transfer of heat, noise and vibration from within the engine compartment or exhaust tunnels into the passenger compartment of the vehicle. Since such shields are subjected to severe conditions, including high temperatures, substantial vibration, and road hazards, these shields must be ruggedly constructed in order to remain serviceable for, essentially, the life of the vehicle. Generally speaking, these shields are made of at least two metal foils sandwiching therebetween an insulation material. For the particular purpose of the shield, the insulation material may be a thermal insulation or an acoustical insulation or a vibrational insulation, or a combination of any two or all three thereof. For example, when the insulation is a glass fibrous batt, that fibrous batt functions as all of a thermal insulator, an acoustical insulator and a vibration insulator. On the other hand, when the insulation material is simply an air space between the two metal foils, the shield functions mainly as a thermal shield. When the insulation material is a high density material, such as impregnated glass fibrous material, the shield can function as a thermal shield and an acoustical shield, as well as have some vibrational insulation properties.

A problem in connection with these shields which has long plagued the art is that of adequately sealing peripheries of the shield sufficiently that the shield will remain sealed over its expected life, will essentially prevent the egress of water and other road contaminations into the interior of the shield, and can be produced in a convenient and economical manner. Various approaches for sealing the peripheries of such shields have been proposed in the art, and include adhesively bonding the peripheries of the shield with high temperature resistant glues, clamping the peripheries of the shield with specially designed clamping devices, and mechanically bending peripheries of the shield into some sealed configuration.

Adhesively bonding the peripheries is most convenient and economical, but under the severe conditions at which the shield operates, the adhesives, glues and the like often fail, and the shield becomes unserviceable by reason of, among others, egress of water into the interior of the shield.

Specialized clamps for clamping the periphery of the shield can be quite effective, and if properly constructed should remain serviceable for the life of the shield. However, such clamps are very expensive to manufacture and time consuming to apply to the shield and, hence, have not been adopted for usual shields of this nature.

Bending of peripheries of the shield to form a seal of the bent foils is an accepted practice, but seals formed by conventional bending techniques are prone to leakage and egress of water and other road contaminations. In addition, with such conventional bending techniques, the seal can be placed on a periphery which is disposed only at an outer edge of the shield. While this limitation has not been a serious limitation in the past, with more modern automobiles, these shields may have peripheries not just on the outer edges thereof but at apertures and other discontinuities in the shield in order to accommodate special provisions for the closely spaced components of modern automobiles. Accordingly, prior art conventional bending techniques of the metal foils of the shield for producing such seals of the shield are no longer applicable to increasing numbers of applications of these shields in modern automobiles.

The art has provided a number of approaches for bending metal foils into a sealed configuration, and for a wide variety of purposes. For example, U.S. Pat. No. 1,206,487, issued in 1916, discloses bending flanges of metal barrels to form chimes on the barrels. In that approach, a barrel head with a flange is fitted into a body of the barrel. By cold rolling, a grooved depression is made between the barrel body and the flange. Thereafter, by compressing the barrel body and flange, the grooved depression is collapsed until the walls of the grooved depression are bent back upon themselves, forming something of a "T"-shaped fold.

U.S. Pat. No. 4,632,592, issued in 1986, shows punching a configuration into two metal foils so as to provide a tubular portion of the two metal foils and then compressing that tubular portion to form something of a "Z"-shaped configured seal.

U.S. Pat. No. 4,760,634, issued in 1988, shows a somewhat similar seal to that of the immediately above-mentioned patent, but discloses the use of a die in forming such a seal. In the method, an upper die passes into a lower die and through metal foils so that a tang of the die penetrates into a bore of the die. During that penetration, the metal of the foil is thinned, and the metal flows in a somewhat "Z"-shaped configuration. U.S. Pat. No. 4,831,711, issued in 1989, shows a somewhat similar approach.

U.S. Pat. No. 4,897,912, issued in 1990, also shows an approach of forming a seal with a die-pressing operation similar to the above-discussed patent. However, in that method, a die and an anvil operating within a die cavity cause deformation of peripheral edges of the joint which is said to increase the strength of the resulting clinch joint. That clinch joint is, again, something of a "Z"-shaped joint.

A similar "Z"-shaped joint is also shown in U.S. Pat. No. 4,910,853, issued in 1990, and U.S. Pat. No. 5,155,897, issued in 1992, shows a similar type joint.

U.S. Pat. No. 5,230,136, issued in 1993, shows a variation of that "Z"-shaped joint, where lateral channels or protrusions may be made in the punched joint.

Finally, U.S. Pat. No. 5,517,743, issued in 1996, shows forming a "Z"-shaped joint by use of a downwardly moved die and an upwardly moved punch.

However, all of these approaches suffer from common disadvantages. First of all, the "Z"-shaped seals, while usually quite effective in maintaining the mechanical structural integrity of the shield, are subject to leakage and especially egress of water into the shield. Secondly, because of the manner in which these "Z"-shaped seals are produced, it is generally not possible, or at least impractical, to attempt forming such seals at a perimeter on the interior of the shield, for example, the perimeter around an aperture in the shield. Thirdly, the process of producing these "Z"-shaped seals are generally fairly complex and are not economical to operate.

Accordingly, it would be of substantial advantage to the art to provide a method of producing a thermal, acoustical and/or vibrational abatement shield which avoids the disadvantages of the prior art and a thermal, acoustical and/or vibrational abatement shield which also avoids the disadvantages of the prior art, as noted above.

BRIEF SUMMARY OF THE INVENTION

The present invention is based on several primary and subsidiary discoveries. Firstly, it was found that a seal could be achieved by operation of certain machinery at peripheries that are not on the outer edge of the shield, e.g. along an aperture within the shield, by use of a combination of a die having an upper anvil and a lower die punch movable within a die cavity. Thus, that die can be placed anywhere along the shield for sealing a periphery, even the periphery surrounding an aperture, and is not restricted to forming that seal on the outer edges of the shield.

Secondly, it was found that if a lower die punch moves upwardly in the die cavity to form a punched section of the periphery where the punched section has vertical walls and a horizontal wall of certain configurations, that so-configured punched section is capable of being collapsed by a downwardly moving die anvil so that the vertical walls of the punched section are collapsed inwardly near a horizontal centerline of the punched section. Such collapsing of the vertical walls will cause the collapsed section to form, on each side thereof, an upper S-shaped configuration of one of the foils of the shield and a lower S-shaped configuration of another of the foils of the shield, and the upper S-shaped configurations totally enclose the lower S-shaped configurations.

By further collapsing those walls, upper laterally-extending walls of the S-shaped configurations compressively contact lower laterally-extending walls of the lower S-shaped configurations, so as to make a compressed T-shaped seal. Since each side of the collapsed section is in an S-shape, and the sides are connected, the fully collapsed seal, in total, produces a "T"-shape.

Such a seal is quite tight and provides improved mechanical integrity to the sealed peripheries and, in addition, substantially improves the resistance to egress of water and the like into the interior of the shield, as opposed to more conventional "Z"-shaped seals, as discussed above in connection with the prior art.

Accordingly, and very briefly stated, the present invention provides a method for producing a thermal, acoustical and/or vibrational abatement shield. The method comprises providing an upper metal foil, providing a lower metal foil, and placing a thermal, acoustical and/or vibrational abatement insulation between the upper and lower foils, such that an upper periphery of the upper foil and a lower periphery of the lower foil are in vertical juxtaposition and totally enclose the insulation. Thereafter, at least a portion of the peripheries are placed in a die having an upper die anvil and a lower die punch movable within a die cavity. This die is capable of being disposed either at the outer edges of the shield for sealing the peripheries of those outer edges or at the inner edges of an aperture within the shield for sealing the peripheries of those inner edges.

The lower die punch is moved upwardly in the die cavity toward the die anvil disposed in the die cavity to form a punched section of the peripheries in the die cavity where the punched section has vertical walls next to the die cavity and a horizontal wall next to the die anvil. The height of the punched section is at least 7 times a combined thickness of the upper and lower foils.

Thereafter, the lower die punch is retracted from the die cavity and, preferably to a distance below the die cavity at least equal to twice the combined thickness of the upper and lower foils and to a position where the lower die punch supports the vertical walls of the punched section and, preferably, portions of the peripheries near the punched section. Then, the die anvil is moved downwardly in the die cavity and in contact with the horizontal wall of the punched section, so as to cause the vertical walls of the punched section to compressively collapse inwardly near a horizontal centerline of the punched section and into the die cavity.

The movement of the die anvil downwardly is continued to compressively collapse the vertical walls inwardly until the upper foil of the punched section is in an upper S-shaped configuration at each side thereof with upper laterally-extending walls of the S-shaped configurations, the lower foil of the punched section is in a lower S-shaped configuration at each side thereof with lower laterally-extending walls of the S-shaped configurations, the upper S-shaped configurations (each side of the punched section) totally enclose the lower S-shaped configurations (each side of the punched section), and the upper laterally-extending walls compressively contact the lower laterally-extending walls. This ensures a very tight and rugged seal.

Also provided is a thermal, acoustical and/or vibrational abatement shield. That shield comprises an upper metal foil, a lower metal foil, and thermal, acoustical and/or vibrational abatement insulation disposed between the upper and lower foils. There is an upper periphery of the upper foil and a lower periphery of the lower foil, wherein the upper and lower peripheries are in vertical juxtaposition and totally enclose the insulation. At least one punched section is provided which seals the upper periphery to the lower periphery. That punched section comprises a portion of the upper periphery in an upper S-shaped configuration at each side of the punched section with upper laterally-extending walls, a portion of the lower periphery in a lower S-shaped configuration at each side of the punched section with lower laterally-extending walls, a horizontal upper wall and a horizontal lower wall extending, respectively, from the upper S-shaped configurations and the lower S-shaped configurations, the upper S-shaped configurations totally enclosing the lower S-shaped configurations, and the upper laterally-extending walls compressively contacting the lower laterally-extending walls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitation of the present invention, and wherein.

DESCRIPTION OF PREFERRED EMBODIMENTS

Figure 1:
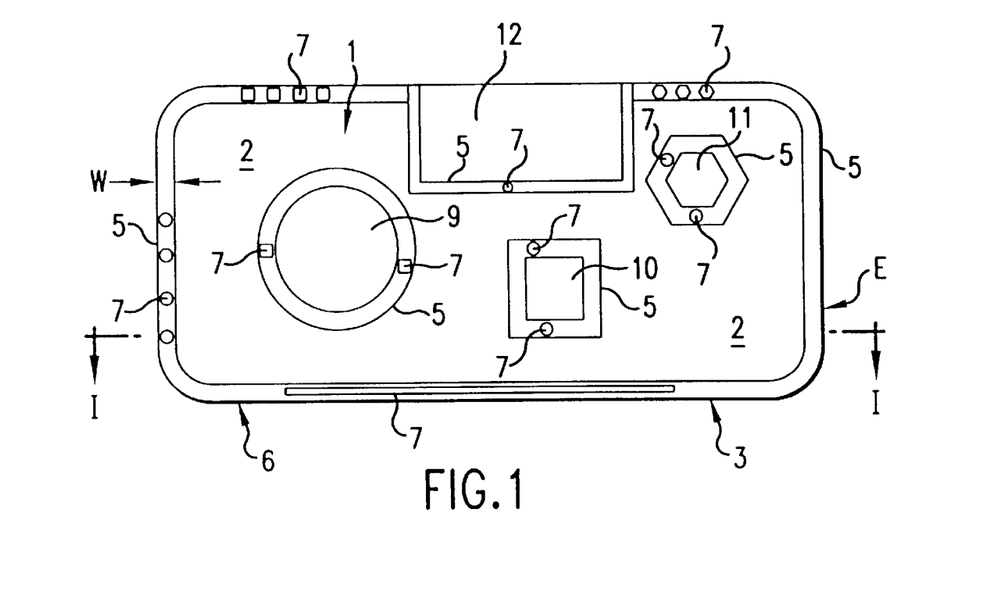
FIG. 1 is a plan diagrammatic view of the shield of the invention.
Figure 2:
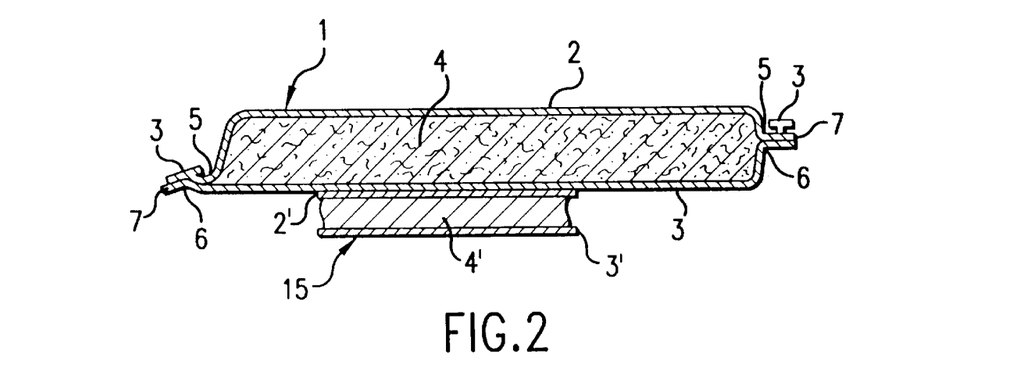
FIG. 2 is a cross-section of FIG. 1 along lines I—I.

Referring first to FIGS. 1 and 2, where FIG. 2 is a cross-section of FIG. 1 along the lines I—I, there is shown a shield, generally 1, having an upper foil 2 and a lower foil 3. A thermal, acoustical and/or vibrational abatement insulation 4 is disposed between the upper foil 2 and the lower foil 3. An upper periphery 5 of the upper foil 2 and a lower periphery 6 of the lower foil 3 are disposed such that the upper and lower peripheries 5, 6 are in vertical juxtaposition and totally enclose the insulation 4, as shown in FIGS. 1 and 2 and particularly in FIG. 2.

There is at least one punched section 7 which seals the upper periphery 5 to the lower periphery 6. FIG. 1 shows a variety of different punched sections 7 in various configurations, including rectangles, circles, polygons and the like, as explained more fully hereinafter.

Figure 3:
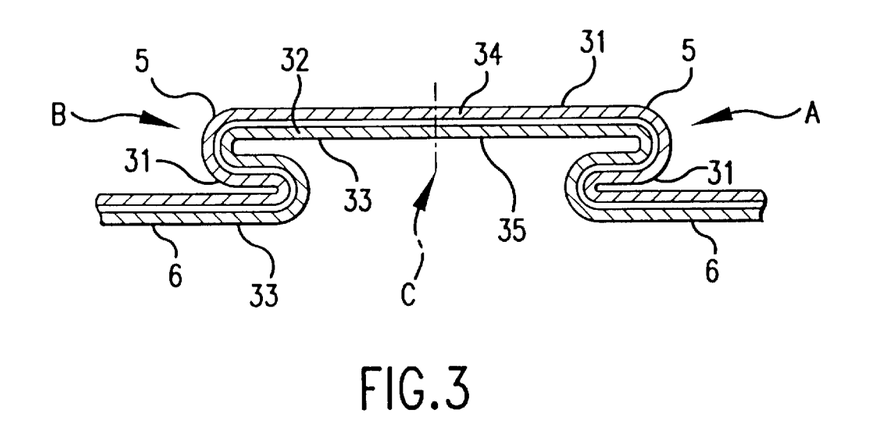
FIG. 3 is an expanded diagrammatic cross-sectional view of the seal of the invention.

The punched section 7 comprises a portion, generally 30, (see FIGS. 3 and 4) of the upper periphery 5 in an upper S-shaped configuration at each side, generally A and B of a centerline C, with upper laterally-extending walls 31 and a portion 32 of the lower periphery 6 in a lower S-shaped configuration, again at each side A and B of centerline C, with lower laterally-extending walls 33. FIG. 3 shows the punched section 7 in a somewhat expanded configuration for clarity, and FIG. 4 shows that punched section 7 in a completely collapsed form, as it would appear in a completed seal.

The punched section 7 also has a horizontal upper wall 34 and a horizontal lower wall 35 extending, respectively, from each of the upper S-shaped configurations and the lower S-shaped configurations.

Figure 4:
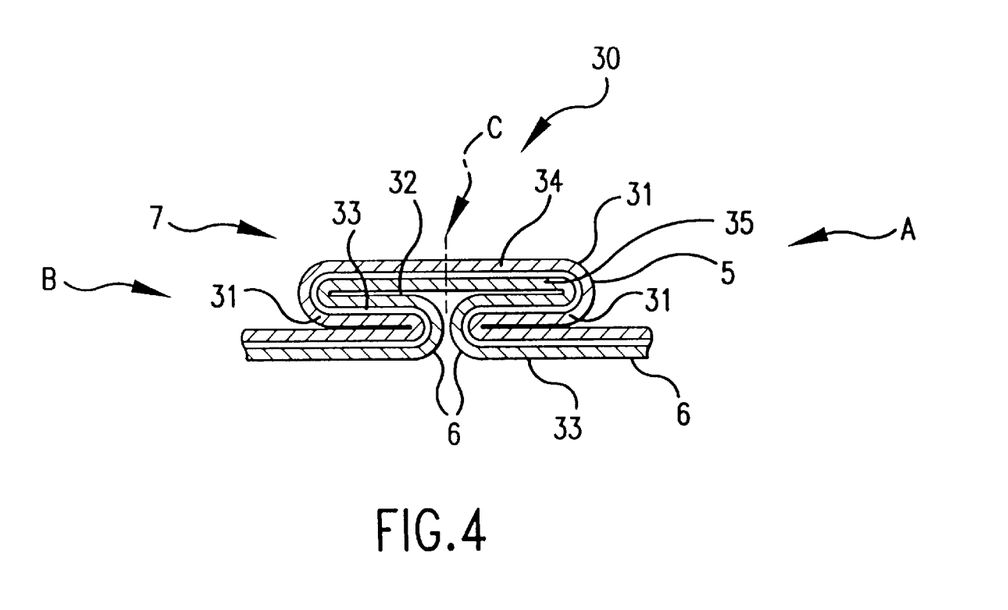
FIG. 4 is a diagrammatic cross-sectional view of the seal of the invention.

It will be noted from FIGS. 3 and 4 that the upper S-shaped configurations (at all sides, including sides A and B) totally enclose the lower S-shaped configurations in that the punched section formed from upper periphery 5 is above and encloses all of the punched section formed from the lower periphery 6. It will also be noted from FIGS. 3 and 4 that the upper laterally-extending walls 31 compressively contact the lower laterally-extending walls 33. As can therefore be seen from FIG. 4, the punched section 7, in its completed and compressed form, provides a very tight seal in a "T"-shaped configuration, i.e. each S-shaped configuration in combination forming a "T"-shape, in cross-section. The seal is mechanically quite rugged and will prevent egress of moisture, water or other contaminants into the shield by virtue of the horizontal upper wall 34 and the upper laterally-extending walls 31 totally enclosing the horizontal lower wall 35 and the lower laterally-extending walls 33.

By virtue of the method of the invention, the punched section 7 can be disposed around any periphery 5, 6 of shield 1 including peripheries of apertures 9, 10 and 11 (see FIG. 1), as well as cutout section 12, which may be cut through the entire shield or only upper foil 2, as shown in FIG. 1, or only through lower foil 3 (not shown in the drawings). As such, the method of the invention, and the shield provided thereby, allows wide latitude in the configuration of the shield, particularly in regard to apertures and cutouts, so that the shield can accommodate closely positioned components of a modern automobile.

To further understand the shield of the invention, the method of making that shield is now described. That method is shown in FIGS. 5 through 8. According to the method for producing the thermal, acoustical and/or vibrational abatement shield, the upper metal foil 2 is provided, as is the lower metal foil 3. A thermal, acoustical and/or vibrational abatement insulation is placed between upper and lower foils 2, 3, as shown in FIG. 2, but not shown in FIGS. 5 through 8, since those figures show only the periphery of the shield, i.e. the portion which does not contain the insulation 4. The insulation 4 is placed between the upper and lower foils 2, 3 such that an upper periphery 5 of the upper foil 2 and a lower periphery 6 of the lower foil 3 are in vertical juxtaposition, as shown in FIGS. 5 through 8, and totally enclose the insulation 4, as shown in FIG. 2. Also, as shown in FIG. 2, that vertical juxtaposition can be at one lower edge of the insulation 4, as shown in the left-hand portion of FIG. 2, or in the middle of that insulation 4, as shown in the right-hand portion of FIG. 2, or anywhere else.

Figures 5, 6, 7:
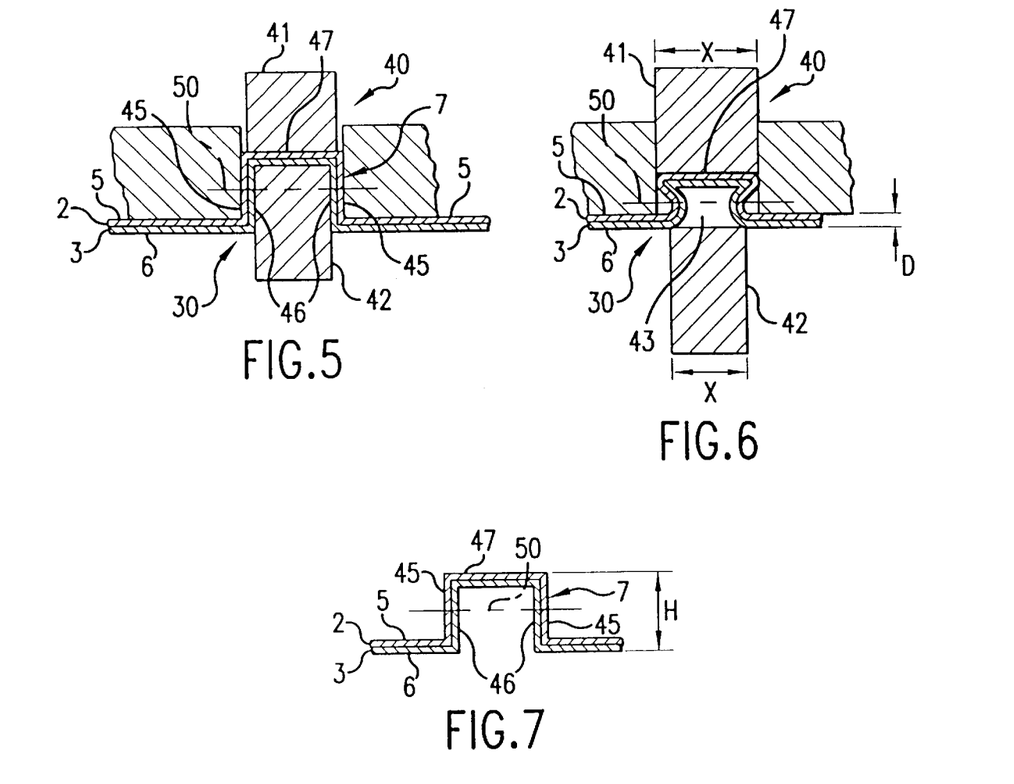
FIG. 5 is a diagrammatic cross-sectional view of the first step of the process of the invention.
FIG. 6 is a diagrammatic cross-sectional view of the second step of the process of the invention.
FIG. 7 is a diagrammatic cross-sectional view of a punched section of the invention, as shown in FIG. 5, but removed from the die for clarity.

Thereafter, a portion, generally 30, of the peripheries 5, 6 is placed in a die, generally 40, having an upper die anvil 41 and a lower die punch 42 movable within a die cavity 43 (see FIG. 6).

The lower die punch 42 is moved upwardly in the die cavity 43 toward the die anvil 41 disposed in the die cavity 43 to form the punched section 7. The punched section 7 is shown in FIG. 7 outside of the die 40 for clarity purposes. That punched section 7 is, of course, formed from the peripheries 5, 6 in the die cavity 43. The punched section 7, as shown in FIG. 7, has vertical walls 45, 46 next to the walls of the die cavity 43 and a horizontal wall 47 next to the die anvil 41. The height H (see FIG. 7) of the punched section 7 is at least 7 times the combined thickness of the upper and lower foils 2, 3. This step of the process is shown in FIG. 5.

Thereafter, as shown in FIG. 6, the lower die punch 42 is retracted. Such retraction can be for a distance such that an upper portion of die punch 42 remains in the cavity 43, but this does not allow the fully compressed seal to horizontally expand as much as possible and makes more difficult the removal of the fully collapsed seal from the die cavity. Thus, it is preferred that the lower die punch 42 is retracted from the die cavity 43 to a distance D (see FIG. 6) below the die cavity 43 at least equal to twice the combined thicknesses of the upper and lower foils 2, 3 and to a position where the lower die punch 42 supports the vertical walls 45, 46 of the punched section 7 and, preferably portions of the peripheries 5, 6 near the punched section 7, as shown in FIG. 6.

As also shown in FIG. 6, the die anvil 41 is correspondingly moved downwardly in the die cavity 43 and in contact with the horizontal wall 47 of the punched section 7, so as to cause the vertical walls 45, 46 of the punched section 7 to compressively collapse inwardly near a horizontal centerline 50 (see FIGS. 5, 6 and 7) of the punched section 7 and into the die cavity 43. The movement of the die anvil 41 is continued downwardly to compressively collapse the vertical walls 45, 46 inwardly until: (a) the upper foil 2 of the punched section 7 is in an upper S-shaped configuration at each side thereof with upper laterally-extending walls 31 (see FIG. 4) of the S-shaped configurations; (b) the lower foil 3 of the punched section 7 is in a lower S-shaped configuration at each side thereof with lower laterally-extending walls 33 of the S-shaped configurations; (c) the upper S-shaped configurations totally enclose the lower S-shaped configurations; and (d) the upper laterally-extending walls 31 compressively contact the lower laterally-extending walls 33, as progressively shown in FIGS. 8 and 9, so as to form the punched section 7 in a "T"-shape in cross-section, shown more clearly in FIG. 4.

Figure 8:
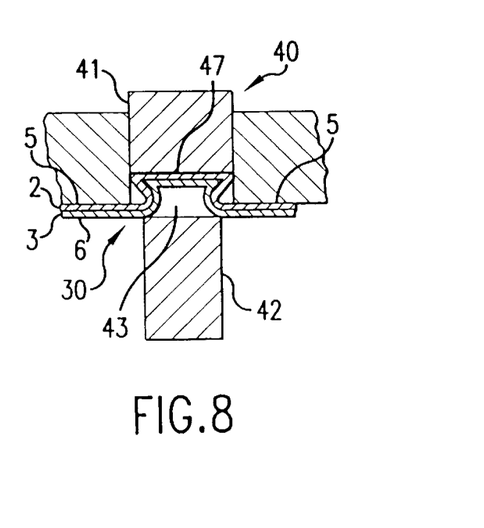
FIG. 8 is a diagrammatic cross-sectional view of the third step of the process of the invention.
Figure 9:
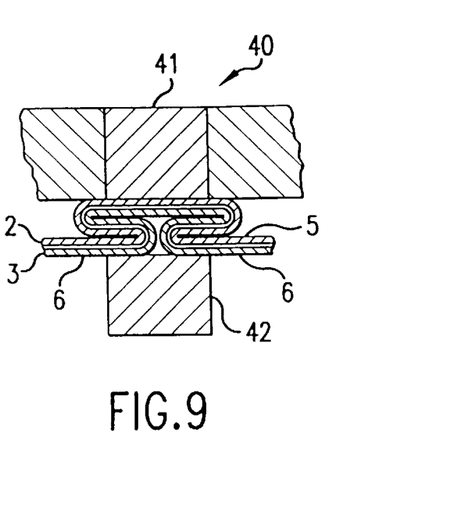
FIG. 9 is a diagrammatic cross-sectional view of the fourth step of the process of the invention.

The S-shaped configurations of the punched section 7 are made possible by the present method because of the sequence of steps, as explained above. More particularly, when the height H of the punched section 7 is at least 7 times a combined thickness of the upper and lower foils 2, 3, and when upper die anvil 41 commences to press against horizontal wall 47, vertical walls 45, 46 carry the load imposed by upper die anvil 41 in a columnar load mode. Since the weakest point of columnar loading is at the centerline 50 thereof, that continual pressure by upper die anvil 41 will cause vertical walls 45, 46 to collapse inwardly along centerline 50, as shown in FIG. 6, and further compression by upper die anvil 41 will cause further collapse of those walls, as shown in FIG. 8. As the upper die anvil 41 closes off cavity 43, and in the preferred embodiment, since lower die punch 42 is below the cavity a distance D, as shown in FIG. 6, the collapsed punched section 7 will form the S-shaped configurations, forming, in total, a "T"-shaped seal in cross-section, as shown in FIG. 9. It is only with this sequence of steps that the collapsed configuration will be that of the S-shaped configuration and form the very tight and rugged seal of the invention. Without such steps, a collapsed form of the punched section 7 could assume almost any shape, such as an accordion shape or a folded over Z-shape of the prior art. Accordingly, it is the method steps of the invention which allow the formation of the S-shaped configurations of the punched section of the invention which in combination form the "T"-shaped cross-section of the fully collapsed seal.

It is, of course, quite apparent that achieving those S-shaped configurations requires the cooperation of upper die anvil 41 and lower die punch 42 in, preferably, providing the distance D (see FIG. 6). It is also apparent that lower die punch 42 must be at least partially and preferably totally removed from the cavity 43 before upper die anvil 41 commences its downward motion to collapse punched section 7 along centerline 50. If lower die punch 42 is not at least partially and preferably totally removed from cavity 43 before that downward motion of upper die anvil 41, then lower die punch 42 would interfere with the collapse of punched section 7 along centerline 50.

It will also be apparent that in order to achieve the collapse along centerline 50, there are some limits in the thickness of the foils 2, 3. To ensure such collapse and formation of the S-shaped configurations, it has been found that the upper and lower foils 2, 3 each should have a thickness of between about 0.001 inch and about 0.1 inch. This will, of course, depend upon the particular materials of the foil. While any metal can be used as the foils, the foils are preferably made of aluminum, steel (including stainless steel) or copper, and these metals, within the foregoing thicknesses, will ensure the collapse of punched section 7 along centerline 50.

The width W (see FIG. 1) of the periphery will, in part, depend upon the particular insulation 4 used in the shield. Thicker insulation and fibrous insulation may require a larger periphery. More particularly, while the insulation can be any inorganic fibrous or particulate material or organic fibrous or particulate material or an air gap, it is preferred that the insulation 4 be inorganic fibrous material, such as fiberglass. With such insulation, thicknesses of the insulation of from about 0.2 inch to about 3.0 inches are satisfactory for most purposes, and with such insulation, the width W of each periphery can be from about 0.2 inch to about 1.0 inch.

As noted above, an important point of the invention is that, with the present process steps, seals can be made in peripheries 5 which are at an outside edge E (see FIG. 1) of the shield 1 and/or within the shield, as shown by the peripheries 5 surrounding the apertures 9, 10 and 11 and cutout 12.

Figure 10:
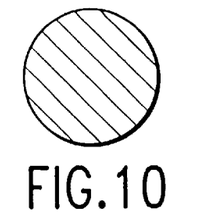
FIGS. 10, 11 and 12 show various cross-sections of die punches.
Figure 11:
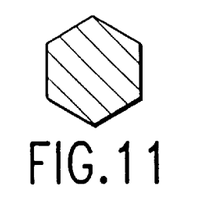
Figure 12:
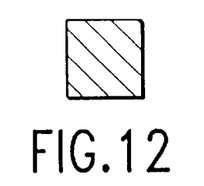
Figure 13:
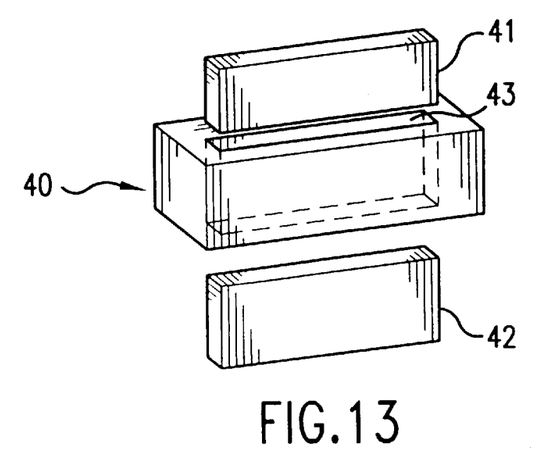
FIG. 13 is a diagrammatic isometric view of an embodiment of the die.

Various configurations of the upper die anvil 41, lower die punch 42 and die cavity 43 can be used to provide various configurations of the punched section 7. As indicated in FIG. 1, and as shown in more detail in FIGS. 10, 11 and 12, the cross-sections of these two take various forms, including circles, polygons and rectangles, as shown, respectively, in FIGS. 10, 11 and 12. However, as also shown in FIG. 1 (the lowermost punched section 7 of FIG. 1), the punched section 7 may extend along the entire peripheries (FIG. 1 showing only a portion of the entire peripheries with a single punched section 7). FIG. 13 shows a die 40 with die cavity 43, upper die anvil 41 and lower die punch 42 in a rectangular form, which would produce that lowermost punched section 7 portion shown in FIG. 1. However, by configuring the die to the shape of the peripheries 5, a single die punch can form a continuous punched section 7 along the entire peripheries of the shield 1. In the case of a complex shield, such as shown in FIG. 1, with apertures and cutouts, the die can be configured to form punched section 7 either continuously as a single punched section along each periphery or spaced-apart punched sections 7 in various shapes (e.g. circles, polygons, squares, etc.), as also shown in FIG. 1. In the case of a single punch, of course, the entire peripheries 5 are placed within die 40 when the method is carried out.

FIGS. 5 through 9 show the upper die anvil 41 and the lower die punch 42 to have flat surfaces on lowermost and uppermost, respectively, surfaces thereof. This is a preferred embodiment, since it simplifies the punching and collapsing of section 7, but such flat surfaces are not required, although preferred. Those surfaces could be of other configurations, and especially decorative configurations.

Since the present seal is a very rugged and leakproof seal, it need not be a large seal, especially as in the prior art. In addition, especially when an entire perimeter is sealed with a single die punch, as explained above, substantial force must be applied by the die 40 in order to achieve such continuous punched section 7. For both of these reasons, the width X (see FIG. 6) of the upper die anvil 41 and the lower die punch 42 is preferably between about 0.1 inch and 1.0 inch, although, more usually, that width X will be between about 0.2 and 0.5 inch. Smaller widths X are preferred where the upper die anvil 41 and the lower die punch 42 extend around the total peripheries 5, since this smaller width requires less overall pressure for such large continuous punched section 7.

The shield may comprise multiple layers of a combination of the upper and lower foils 2, 3 and insulation 4 therebetween. FIG. 2 shows such multiple layers in the form of a second layer, generally 15, having an upper foil 2', a lower foil 3' and insulation 4' therebetween. Normally, multiple layers will not be required, but for special applications, such multiple layers of the shield can be employed. In such case, the multiple layers can be sealed at common peripheries by a single punched section 7.

Since these shields are quite rugged and essentially prevent the egress of moisture, water and the like, they are ideally applicable to automotive use, although they can be used for any desired application. However, since the punched section 7 can seal peripheries both on the edge of the shield and along apertures within the shield, so as to accommodate closely spaced components, the shields are particularly useful in a configuration suitable for mounting on an automobile or truck.

It should be noted that terms such as upper, lower, horizontal, etc., as used in the specification and claims, are for purposes of distinction and not to indicate a required direction or orientation.

What is claimed is:

1. A method for producing a thermal, acoustical and/or vibrational abatement shield (1), comprising:
   (1) providing an upper metal foil (2);
   (2) providing a lower metal foil (3);
   (3) placing a thermal, acoustical and/or vibrational abatement insulation (4) between the upper and lower foils (2, 3) such that an upper periphery (5) of the upper foil (2) and a lower periphery (6) of the lower foil (3) are in vertical juxtaposition and totally enclose the insulation;
   (4) placing at least a portion (30) of said peripheries (5, 6) in a die (40) having an upper die anvil (41) and a lower die punch (42) movable within a die cavity (43);
   (5) moving the lower die punch (42) upwardly in the die cavity (43) toward the die anvil (41) disposed in the die cavity (43) to form a punched section (7) of the peripheries (5, 6) in the die cavity (43) where the punched section (7) has vertical walls (45, 46) next to walls of the die cavity (43) and a horizontal wall (47) next to the die anvil (41), and a height (H) of the punched section (7) is at least 7 times a combined thickness of the upper and lower foils (2, 3);
   (6) retracting the lower die punch (42) from the die cavity (43) to a position where the lower die punch (42) supports the vertical walls (45, 46) of the punched section (7);
   (7) moving the die anvil (41) downwardly in the die cavity (43) and in contact with the horizontal wall (47) of the punched section (7) so as to cause the vertical walls (45, 46) of the punched section (7) to compressively collapse inwardly near a horizontal centerline (50) of the punched section (7) and into the die cavity (43); and
   (8) continuing the movement of the die anvil (41) downwardly to compressively collapse the vertical walls (45, 46) inwardly until: (a) the upper foil (2) of the punched section (7) is in an upper S-shaped configuration at each side thereof with upper laterally-extending walls (31) of the S-shaped configurations; (b) the lower foil (3) of the punched section (7) is in a lower S-shaped configuration at each side thereof with lower laterally-extending walls (33) of the S-shaped configurations; (c) the upper S-shaped configurations totally encloses the lower S-shaped configurations; and (d) the upper laterally-extending walls (31) compressively contact the lower laterally-extending walls (33).

2. The method of claim 1, wherein the upper and lower foils (2, 3), each, have a thickness of between about 0.001 inch and 0.10 inch.

3. The method of claim 1, wherein the foils (2, 3) are made of aluminum, steel or copper.

4. The method of claim 1, wherein the insulation (4) is an inorganic fibrous or particulate material, an organic fibrous or particulate material, or an air gap.

5. The method of claim 1, wherein the width (W) of each periphery (5) is from about 0.2 inch to about 1.0 inch.

6. The method of claim 1, wherein the peripheries (5) are at an outside edge (E) of the shield (1) and/or within the shield (1).

7. The method of claim 1, wherein the entire peripheries (5) are placed within the die (40).

8. The method of claim 1, wherein the upper die anvil (41) and the lower die punch (42) have flat surfaces on lowermost and uppermost, respectively, surfaces thereof.

9. The method of claim 1, wherein a width (X) of the upper die anvil (41) and lower die punch (42) is between about 0.1 inch and 1.0 inch.

10. The method of claim 1, wherein the lower die punch (42) is retracted from the die cavity (43) to a distance (D) below the die cavity (43) at least equal to twice the combined thicknesses of the upper and lower foils (2, 3).

11. At least one of a thermal, acoustical and vibrational abatement shield, comprising:
    (1) an upper metal foil;
    (2) a lower metal foil;
    (3) at least one of a thermal, acoustical and vibrational abatement insulation disposed between the upper foil and the lower foil;
    (4) an upper periphery of the upper foil and a lower periphery of the lower foil, wherein the upper and lower peripheries are in vertical juxtaposition and totally enclose the insulation
    (5) at least one punched section which seals the upper periphery to the lower periphery, said punched section comprising:
       (a) a portion of the upper periphery in an upper S-shaped configuration at each side of the punched section with upper laterally-extending walls;
       (b) a portion of the lower periphery in a lower S-shaped configuration at each side of the punched section with lower laterally-extending walls;
       (c) a horizontal upper wall and a horizontal lower wall extending, respectively, from the upper S-shaped configurations and the lower S-shaped configurations;
       (d) the upper S-shaped configurations totally enclosing the lower S-shaped configurations; and
       (e) the upper laterally-extending walls compressively contacting the lower laterally-extending walls.

12. The shield of claim 11, wherein the upper and lower foils each, have a thickness of between about 0.001 inch and 0.10 inch.

13. The shield of claim 11, wherein the foils are made of aluminum, steel or copper.

14. The shield of claim 11, wherein the insulation is an inorganic fibrous or particulate material, an organic fibrous or particulate material, or an air gap.

15. The shield of claim 11, wherein the width of each periphery is from about 0.2 inch to about 1.0 inch.

16. The shield of claim 11, wherein the peripheries are at an outside edge of at least one of the shield and within the shield.

17. The shield of claim 11, wherein the width of the punched section is between about 0.1 inch and 1.0 inch.

18. The shield of claim 11, wherein the punched section extends around the total of the peripheries.

19. The shield of claim 11, wherein the shield comprises multiple layers of the combination of the upper and lower foils and insulation therebetween.

20. The shield of claim 11, in a configuration suitable for mounting on an automobile or truck.

21. The shield of claim 11, wherein the punched section is discontinuous around the upper periphery and the lower periphery.

22. The shield of claim 21, wherein all of the at least one punched sections cover a predetermined area of the upper and lower peripheries and wherein the predetermined area covers less than a majority of the upper and lower peripheries such that a majority of the upper and lower peripheries are free of the punched sections.

23. The shield of claim 11, wherein the upper metal foil and the lower metal foil each have an outer periphery and wherein the juxtapositioned upper periphery and lower periphery are located separate from the outer peripheries such that the punched section is located interiorly in the shield.

24. The shield of claim 23, wherein the insulation surrounds the at least one punched section.

25. The shield of claim 11, wherein the insulation surrounds the at least one punched section.

* * * * *